United States Patent [19]

Filipescu

[11] Patent Number: 5,782,041
[45] Date of Patent: Jul. 21, 1998

[54] COLUMN PROTECTOR DETERRING UNAUTHORIZED CLIMBING ACCESS BY HUMAN BEING

[76] Inventor: Dorian Filipescu, 1562 3/4 N. Verdugo Rd., Glendale, Calif. 91208

[21] Appl. No.: 837,016

[22] Filed: Apr. 11, 1997

[51] Int. Cl.⁶ .................................................. E04B 1/72
[52] U.S. Cl. ...................... 52/101; 52/737.5; 52/736.4; 52/517; 47/24
[58] Field of Search .......................... 51/101, 737.5, 51/736.4, 517; 47/23–25, 30; 52/101, 737.5, 736.4, 517, 670, 673, 675, 799.1

[56] References Cited

U.S. PATENT DOCUMENTS

| | | | |
|---|---|---|---|
| 420,654 | 2/1890 | Hayes | 52/675 |
| 420,655 | 2/1890 | Hayes | 52/675 |
| 420,656 | 2/1890 | Hayes | 52/675 |
| 420,660 | 2/1890 | Hayes | 52/675 |
| 427,988 | 2/1890 | Hayes | 52/675 |
| 727,054 | 5/1903 | Arndt | 47/24 |
| 1,101,145 | 6/1914 | Poenicke | 47/24 |
| 1,512,618 | 10/1924 | McDonald | 47/24 |
| 4,404,778 | 9/1983 | Ushimaru | 52/101 |
| 5,596,834 | 1/1997 | Ritter | 52/101 X |

*Primary Examiner*—Robert Canfield
*Attorney, Agent, or Firm*—George J. Netter

[57] ABSTRACT

A guard (12) for a column (10) includes a flexible metal sheet (14) having a plurality of individual barblike means (20) extending outwardly from a common major sheet surface with each barblike means (20) having four sidewall points (28) extending in respectively different directions. The guard (12) is installed on a column by wrapping around the column (10) and secured thereto by a metal strip (30) clamped about the guard.

15 Claims, 1 Drawing Sheet

U.S. Patent     Jul. 21, 1998     5,782,041
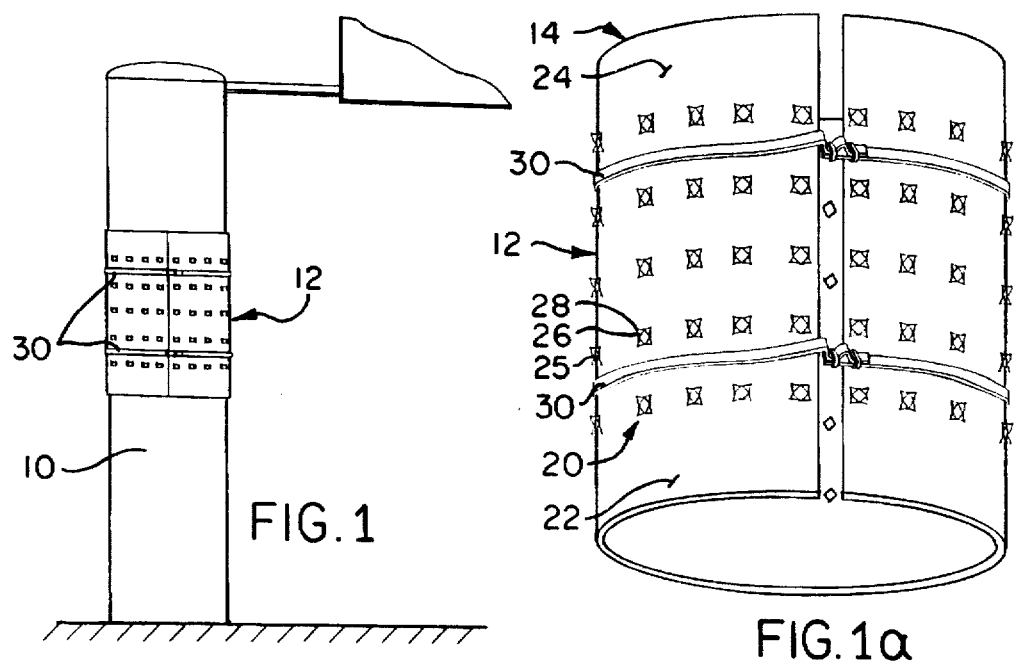
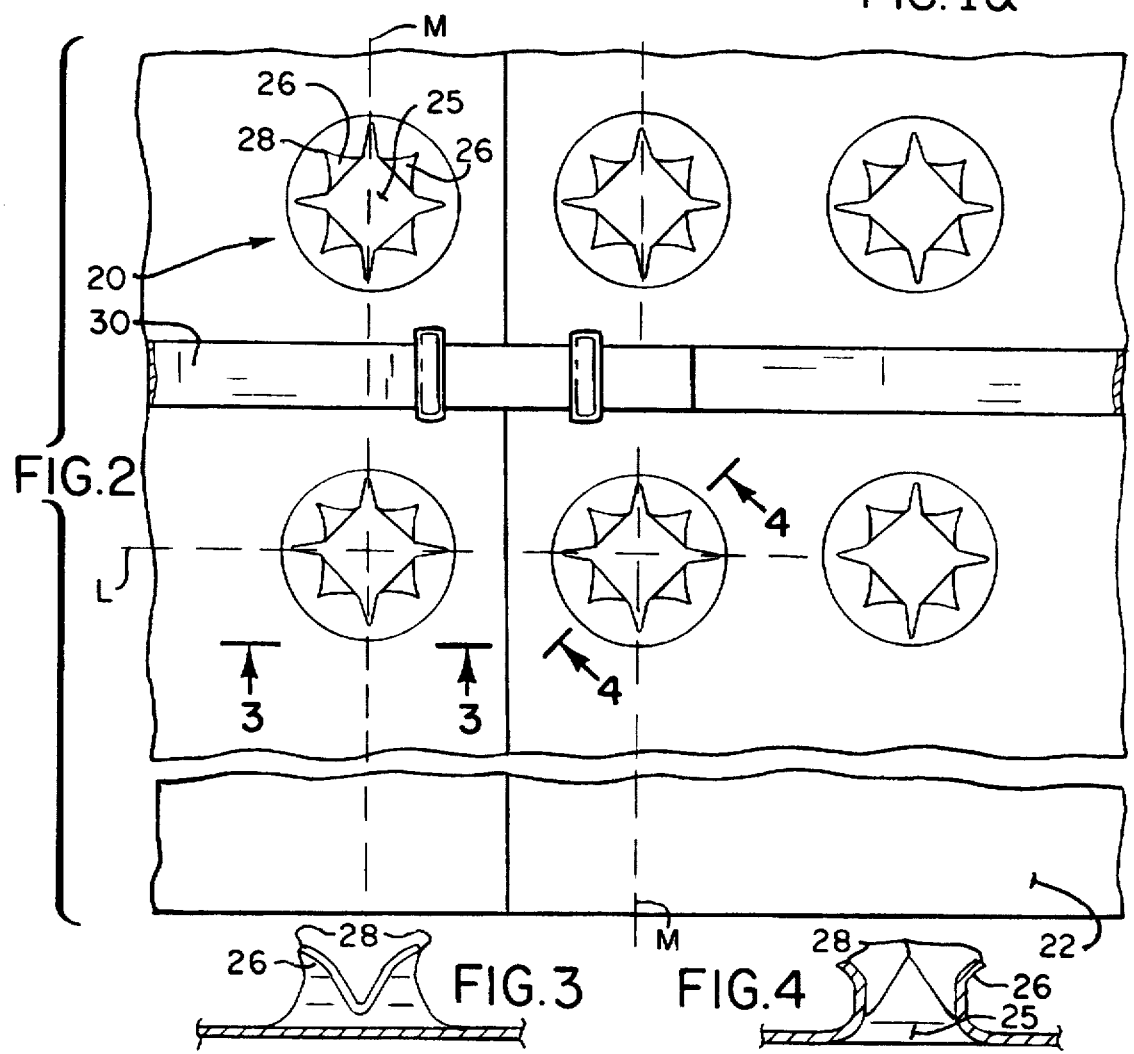

COLUMN PROTECTOR DETERRING UNAUTHORIZED CLIMBING ACCESS BY HUMAN BEING

BACKGROUND

1. Field of the Invention

The present invention relates generally to a column protector or guard to deter a human being from climbing up or down the column for unauthorized purposes.

2. Description of Related Art

A present day problem of ever-increasing intensity is the application of graffiti onto visible areas of buildings, street signs and the like. A particular species of graffiti which is dangerous particularly to the individuals making the graffiti, is the defacing of freeway, expressway, street and highway signs which are typically mounted at the upper end of very long cement or metal columns. Not only is the production of the graffiti troublesome to motorists since the street and highway designations cannot then be readily determined, but also the individuals who make the graffiti are at great risk of falling and injuring themselves due to the relative height that the signs are located above the highway.

A variety of protective devices have been utilized in the past to prevent animals from damaging trees, posts, or columns or climbing them. See, for example, U.S. Pat. Nos. 727,054, 1,101,145 and 1,512,618 which disclose relatively narrow bands having pointed members extending outwardly to keep the animals at a distance. None of these patented devices would be especially useful in deterring a human being since a determined individual could rather easily climb past such narrow devices. U.S. Pat. No. 4,404,778 also discloses a metal strip having a number of V-shaped projections extending outwardly from one side of the strip and adapted for mounting onto a horizontal surface to prevent access by animals.

For the most part known techniques for preventing access of animals are at best only partially successful against deterring human beings. In the past, a technique which has been used in this connection and which is quite prevalent at the present time, is the use of barbed wire or the particular species thereof known as "razor wire". Razor wire has very sharp elements spaced along wire coils that can cause great injury to an individual attempting to crawl across it. This approach is, of course, quite dangerous to individuals who might still attempt to crawl across it and has been objected to for that reason alone. In addition to the danger posed in the use of razor wire, its appearance is totally lacking in aesthetics and objectionable for this reason, also.

It is, therefore, a desideratum to provide a means for deterring human climbing access of a column without, at the same, posing exceptional danger to anyone except a completely foolhardy climber, and at the same time preserving aesthetics to the column appearance.

SUMMARY OF THE INVENTION

In accordance with the practice of the present invention there is provided a protector or guard installed about the circumferential surface of a column, such as a freeway sign metal or cement column, presenting an especially formed outer surface that will deter an individual from climbing up and past the guard for unauthorized purposes, such as producing graffiti on freeway signs. The guard includes a generally rectangular sheet of metal having its surface treated to prevent rusting or other deteriorations as a result of contact with the environmental atmosphere. What is to be the outer surface of the guard after installation includes a plurality of barblike means arranged in closely spaced relation to one another so that the hand of an individual cannot be readily placed between adjacent barblike means for gripping purposes or generally applying pressure with the hands for the purpose of attempting to climb past the guard. Each barblike means includes separate barbs extending outwardly in four different angularly spaced apart directions, as well as having the pointed outer ends turned back toward the main body or sheetlike base of the guard. At what will be the top edge and lower edge of the guard when it is mounted onto a column, there are bands along both the upper and lower guard edges which are free from barblike means and safe for handling during installation manipulation. It is contemplated that the guard be made in elongated strips or bands from which appropriate lengths can be cut off to accommodate any particular column diameter.

To install a guard onto a column, an appropriate length is wrapped around the column with its end portions slightly overlapping to provide a substantially continuous amount of barbed-like means in relatively equal spacing from one another extending completely about the entire periphery of the column. The barbed sheet is then retained in place by one or more relatively narrow metal strips which extend about the complete periphery of the column and underlying guard with the two end portions of each strip being brought adjacent one another and either crimped together or secured together by a third metal piece which is crimped thereabout.

When installed, the column guard exceeds a predetermined maximum length measured along the axis of the column that an individual attempting to climb the column would be able to readily reach beyond (over) the guard so as to get a sufficient handhold for swinging or pulling himself up over the guard without encountering the barb-like means. Also, since the barblike means have individual barbs pointing in four different directions, there is no manner of changing the approach direction that would lessen climbing difficulty. Still further, with the special construction of each barb it -would be a very difficult operation to flatten the barbs out to a safe condition enabling climbing therepast.

BRIEF DESCRIPTION OF THE DRAWING

These and other objects and advantages of the present invention will become more readily apparent upon reading the attached detailed description and upon reference to the attached drawings, in which:

FIG. 1 is a perspective view showing the invention installed on a column and FIG. 1a is an enlarged perspective view of the invention;

FIG. 2 is an elevational view looking directly onto the outer surface of the guard;

FIG. 3 is a side elevational sectional view taken along the lines 3—3 of FIG. 2; and FIG. 4 is a further elevational view taken along the line 4—4 of FIG. 2.

DESCRIPTION OF PREFERRED EMBODIMENT

Turning now to the drawings and particularly FIG. 1, there is shown a part of a typical freeway sign with supporting column 10 which can be seen located along freeways or limited access highways throughout the country. Such columns are typically as much as 25–30 feet in height and can be as large as 2–3 feet in diameter. As already noted, in the past it has been conventional to provide at the upper column end such things as razor wire coils (not shown)

which would extend across a considerable portion of the bracket holding the sign as well as the upper end portion of the column, detracting totally from the esthetics of the column and sign. In accordance with the present invention, however, there is provided a guard or protector 12 described in greater detail later herein which is secured around the column at a distance from its upper end and is so constructed as to substantially prevent an individual from climbing past the guard to obtain access to the sign portion for defacing the sign, or other undesirable and unauthorized purposes. Moreover, the guard 12 appearance is not such as to detract from over appearance esthetics.

The material from which the invention 12 is constructed consists of a sheet 14 of metal (e.g., steel) having a thickness of approximately 0.01–0.03 inches and with an outer surface that is galvanized, anodized or otherwise treated in a manner to retard its deterioration from the environment. The metal sheet 14 is a one-piece construction having a width of about 36 inches or more measured between side edges 16 and 18 which are substantially parallel to one another. The metal sheet is preferably made in sufficient length to accommodate the making of a number of guards by merely cutting off the desired length for each guard. After processing, as will be described, the entire metal sheet can be formed into a roll for convenient storage. In use, an appropriate length is cut off the roll to provide each guard.

As seen best in FIG. 2, the metal sheet 14 includes a plurality of barblike means 20 formed from the sheet metal itself and arranged in a matrix throughout the sheet extending outwardly from a common major surface. More particularly, each of the barblike means 20 is spaced from its immediate neighbor an identical amount d which is approximately two inches leaving an intervening space insufficient for an individual to seize, grip or apply pressure with a hand or arm and, at the same time, avoid injury producing contact with the barblike means. The means 20 are arranged in mutually spaced apart, longitudinally extending lines L and in transversely extending, mutually spaced apart lines M, the lines L and M crossing each other at 90 degrees forming a matrix.

First and second opposite edge portions 22 and 24 of the metal sheet 14 are free from barblike means 16 throughout the entire length of the metal sheet. These barb-free edge portions enable an individual to easily handle or install the guard or protector 12 on a column 10 lessening danger to himself.

For the ensuing detailed description of the barblike means 20 construction, reference is made simultaneously to FIGS. 2, 3 and 4. Each of the barblike means 20 is formed by piercing of the metal sheet 14 with a tool (not shown) having a square cross-section and a pointed end. In this manner, an opening 25 is encompassed by four identical generally triangular side walls 26 separated from one another and having outwardly extending pointed ends 28, which pointed ends are turned back away from opening 25 and face downwardly slightly toward the major surface of the sheet 14. It is to be noted that each line (M) lies between two pairs of pointed side walls 26 of each means 20. In this way, the pointed sidewalls 26 extend outwardly away from line M at approximately 45°, two upward to the right and left and two downward to the right and left as shown in FIG. 2.

Installation of the guard or protector onto the column as shown in FIG. 1 is accomplished by cutting an appropriate length guard 12 so that it will fully encircle a particular column 10 when wrapped thereabout. Primarily handling the edge portions 22 and 24, the guard is then wrapped snugly about the column with the barblike beams extending outwardly and sheet 14 end portions possibly in slightly overlapping relationship. Securement to the column is provided by two or more elongated metal strips 30 which are each located between a pair of longitudinally extending rows L of barblike means 20, the end portions of which strips are secured to one another by a metal body 32 that is clamped over the two end portions thereof.

In the practice of the present invention there is provided a protective guard with a large number of barblike means, the guard being wrapped completely around a column and secured thereto so as to deter an individual attempting to climb thereover and effect damage or defacement to property located at the upper end of the column. Due to the predetermined length chosen for the protective guard, an individual attempting to get past the guard finds that he is unable to reach above or beyond it and grip the column in a manner so as to raise the remainder of his body past the guard without incurring injury to himself. It is also to be noted that the various pointed ends 28 extend away from the center of each barblike means over a 360-degree range so that there is no preferred or easy direction from which an individual attempting to get past the protector or protective band can move. Also, in view of the symmetry of the barblike means and the edge portions 22 and 24 arranged at opposite edges of the guard, the guard may be mounted with either edge up or down and the results are the same. Still further, even if climbing above the guard can somehow be accomplished, there is still a problem on retreating down over the guard since there are certain of the pointed ends 28 which are directed upwardly to engage the clothing and body of the unauthorized climber.

Although the invention has been described in connection with a preferred embodiment, it is understood that those skilled in the appertaining arts can make changes which will come within the spirit of the invention as described and within the ambit of the appended claims.

What is claimed is:

1. A protective guard for deterring human access thereacross, comprising:

a metal sheet having a plurality of barblike means formed in the sheet and extending outwardly from a common major surface, each such means including, four generally triangular sidewalls arranged spaced apart about an opening, each having a pointed end portion turned back away from the opening and toward the sheet and at least one metal band which extends about said metal sheet in closed curve form with two opposite end portions which are adapted to be secured together.

2. A protective guard as in claim 1, in which the metal sheet has a pair of opposite outer edges with immediately adjacent strips free of barblike means.

3. A protective guard as in claim 2, in which the barblike means are arranged in spaced apart relation forming a matrix on a plurality of lines L extending longitudinally and parallel to metal sheet side edges, and at points of intersection of a plurality of transversely extending lines M with lines L, the mutual spacing of lines M and lines L being identical.

4. A protective guard as in claim 3, in which the mutual spacing of lines L and M is approximately 2 inches.

5. A protective guard as in claim 2, in which the distance between the metal sheet outer edges is about 36 inches or more.

6. A protective guard as in claim 1, in which the metal sheet has a thickness in the approximate range of 0.01–0.03 inches.

7. A protective guard as in claim 2, in which the barblike means are each located on a straight line M transversely extending between the metal sheet opposite edges with a first pair of sidewalls extending angularly from said line M toward one said edge and a second pair of sidewalls extending angularly from said line M toward the other said edge whereby moving contact with the barblike means along any direction 360 degrees about a barblike means opening encounters at least one point.

8. A protective guard as in claim 1, in which said metal sheet has first and second parallel major surfaces and is sufficiently flexible to enable forming said sheet into a smooth closed curve about an axis spaced from one of said major surfaces and parallel thereto.

9. A protective guard as in claim 1, in further means are provided clamping the band two opposite end portions together.

10. A guard for application to a column to deter climbing by a human being therepast, comprising:

an elongated flexible metal sheet having a transverse dimension of at least 36 inches, said sheet being formed about a transversely extending axis spaced from said sheet and parallel thereto in a smooth arcuate closed path with opposite end portions engaging one another;

a plurality of barblike means pierced from the metal sheet and extending outwardly from a common major surface of said sheet, each barblike means including four sidewalls equispaced around an opening with each sidewall terminating at a point directed away from the opening; and at least one metal strip contactingly extending completely about the arcuately formed sheet with opposite end portions secured together.

11. A guard as in claim 10, in which a further means is clamped about the strip opposite end portions to secure said strip about said metal sheet in a unitary relationship.

12. A guard as in claim 10, in which the metal sheet is generally rectangular with opposite parallel side edges, said barblike means being arranged in spaced apart lines generally parallel to said metal sheet side edges with the spacing between adjacent lines being approximately 2 inches.

13. A guard as in claim 12, in which the metal sheet is bilaterally symmetrical about the longitudinal axis of said sheet.

14. A guard as in claim 12, in which metal sheet includes first and second lateral edge portions free from barblike means extending along the full length of said sheet.

15. A guard as in claim 10, in which the metal sheet is constructed of steel having its outer surface treated to resist deterioration from the environment.

* * * * *